(12) United States Patent
Du et al.

(10) Patent No.: US 10,142,578 B2
(45) Date of Patent: Nov. 27, 2018

(54) METHOD AND SYSTEM FOR COMMUNICATION

(71) Applicant: Alibaba Group Holding Limited, George Town (KY)

(72) Inventors: Wuping Du, Hangzhou (CN); Ming Zong, Hangzhou (CN); Lanlan Zhao, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

(21) Appl. No.: 14/680,273

(22) Filed: Apr. 7, 2015

(65) Prior Publication Data

US 2015/0296167 A1 Oct. 15, 2015

(30) Foreign Application Priority Data

Apr. 9, 2014 (CN) .......................... 2014 1 0140878

(51) Int. Cl.
*H04N 7/173* (2011.01)
*H04N 5/44* (2011.01)
*G06F 3/16* (2006.01)
*H04N 7/14* (2006.01)
*H04N 21/422* (2011.01)
*H04N 21/4788* (2011.01)

(52) U.S. Cl.
CPC ............ *H04N 5/4403* (2013.01); *G06F 3/16* (2013.01); *H04N 7/142* (2013.01); *H04N 7/147* (2013.01); *H04N 21/42207* (2013.01); *H04N 21/42208* (2013.01); *H04N 21/42222* (2013.01); *H04N 21/4788* (2013.01)

(58) Field of Classification Search
CPC ....... H04N 21/42207; H04N 21/42208; H04N 21/42222; H04N 21/4788
See application file for complete search history.

(56) References Cited

U.S. PATENT DOCUMENTS

| | | | |
|---|---|---|---|
| 7,606,529 B1 | 10/2009 | Swan et al. | |
| 8,195,218 B1 | 6/2012 | Swan et al. | |
| 9,098,639 B2* | 8/2015 | Lee ........................ | G06F 13/385 |
| 2006/0203975 A1* | 9/2006 | Erhart ................. | H04M 3/4938 |
| | | | 379/88.01 |
| 2007/0070188 A1 | 3/2007 | Shyu | |
| 2007/0139514 A1 | 6/2007 | Marley et al. | |

(Continued)

FOREIGN PATENT DOCUMENTS

| | | |
|---|---|---|
| CN | 101202822 | 6/2008 |
| CN | 102075810 | 5/2011 |

(Continued)

*Primary Examiner* — Olugbenga O Idowu
(74) *Attorney, Agent, or Firm* — Van Pelt, Yi & James LLP

(57) ABSTRACT

Providing communication includes receiving, via a set-top box of a first communication device, a call request message via a network from a second communication device, sending, via the set-top box, a notification message to a remote control device of the first communication device while a television set is turned off, providing, via the remote control device, a user prompt in response to the sending of the notification message, and establishing, via the remote control device, a communication connection through the set-top box with the second communication device after receiving a call response, the remote control device being wirelessly connected to the set-top box.

21 Claims, 8 Drawing Sheets

(56) References Cited

U.S. PATENT DOCUMENTS

| | | | |
|---|---|---|---|
| 2008/0152110 A1* | 6/2008 | Underwood | H04M 1/2535 |
| | | | 379/142.16 |
| 2011/0242268 A1* | 10/2011 | Kim | H04M 7/0063 |
| | | | 348/14.04 |
| 2011/0307932 A1 | 12/2011 | Fan et al. | |
| 2012/0127259 A1 | 5/2012 | Mackie et al. | |

FOREIGN PATENT DOCUMENTS

| | | |
|---|---|---|
| CN | 103327380 | 9/2013 |
| JP | 2007243811 | 9/2007 |

* cited by examiner

3000

4000

5000

6000

7000

METHOD AND SYSTEM FOR COMMUNICATION

CROSS REFERENCE TO OTHER APPLICATIONS

This application claims priority to People's Republic of China Patent Application No. 201410140878.5 entitled A REMOTE CONTROL DEVICE, A COMMUNICATION DEVICE, A COMMUNICATION SYSTEM, AND A COMMUNICATION METHOD, filed Apr. 9, 2014 which is incorporated herein by reference for all purposes.

FIELD OF THE INVENTION

The present application relates to a method and a system for communication.

BACKGROUND OF THE INVENTION

As science and technology develop, television sets have been increasing their "intelligence." In addition to traditional video and gaming functions, smart televisions are capable of performing cross-platform searches between televisions, the Internet, and programs via network functions. In addition to computers and mobile phones, the smart televisions are a third type of information access terminal. Users can access information via the smart televisions.

Conventional smart televisions can provide television users with audiovisual communication services. Typically, voice input is accomplished through a voice input device contained within or external to the television. For example, a microphone attached to a camera or a remote control with a microphone function is used as the voice input device.

When a microphone attached to a camera is used as a voice input device, distance from the television becomes a constraint. A user can only use the microphone within a certain distance from the television, and a result of the constraint is an inconvenience for the user. When a remote control including a microphone function is used as the voice input device, the distance constraint problem is resolved, but to use the remote control, the television is required to be on during voice communications. Also, when the television is not turned on, the television cannot receive video communication call requests.

Accordingly, when a television set is turned off, the television set cannot receive voice/video call requests, and the television set cannot conduct voice communications. Keeping the television set on only partially solves the problem as leaving the television set on a longer period of time will increase energy consumption.

BRIEF DESCRIPTION OF THE DRAWINGS

Various embodiments of the invention are disclosed in the following detailed description and the accompanying drawings.

DETAILED DESCRIPTION

Figure 1:
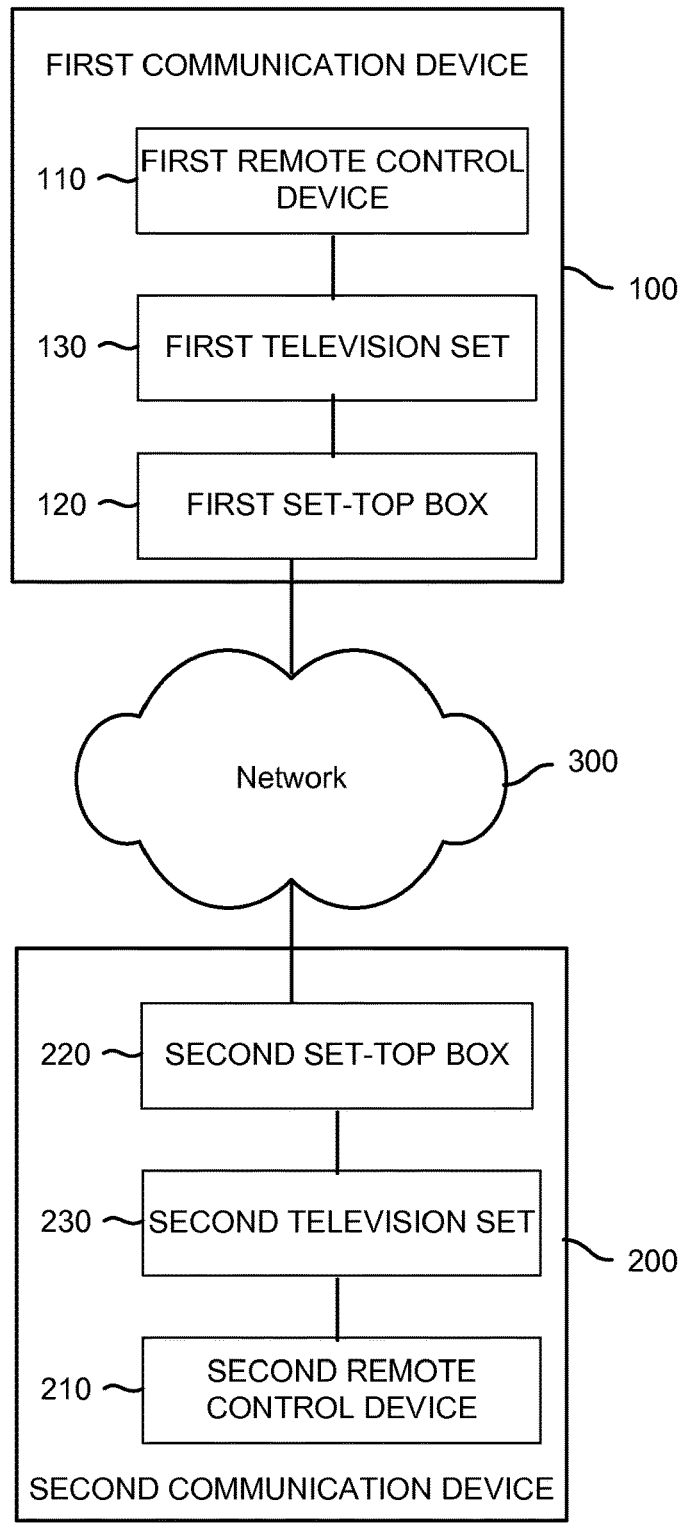
FIG. 1 is a structural block diagram of an embodiment of a system for communication.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

For clarity, a description is provided below using an example of two remote control devices (a first remote control device and a second remote control device) which communicate through set-top boxes (a first set-top box and a second set-top box, which can be smart television set-top boxes, IPTV set-top boxes, or other set-top boxes which are devices that execute IP access applications such as browser applications and native applications developed by developers). The first remote control device and the first set-top box correspond to communication devices of an initiating party (calling party) of a call. A wireless interface is set up between the first remote control device and the first set-top box when wireless communication between the first remote control device and the first set-top box occurs. The second remote control device and the second set-top box are the communication devices of a receiving party (called party) of the call. A wireless interface is also set up between the second remote control device and the second set-top box where wireless communication between the second remote control device and the second set-top box occurs. In some embodiments, the above wireless interfaces are based on a wireless interface technology such as Wi-Fi (Wireless Fidelity) or Bluetooth.

In some embodiments, the remote control devices each include a microphone module, a speaker module, and an LCD screen, and the remote control devices perform a voice capture function, a speaker function, a display-related prompt function, and other communication-related functions. Examples of the display screen include a monochromatic liquid crystal screen, a color liquid crystal screen, a touchscreen, and the like. A user can initiate a call request through a remote control device. Voice signals are captured through the built-in microphone module, and received voice signals are played and output as voice through the speaker module.

FIG. 1 is a structural block diagram of an embodiment of a system for communication. In some embodiments, the system 1000 comprises a first communication device 100 and a second communication device 200 connected via a network 300. In some embodiments, the first communication device 100 comprises a first remote control device 110, a first set-top box 120, and a first television set 130. In some embodiments, the second communication device 200 comprises a second remote control device 210, a second set-top box 220, and a second television set 230.

In an application scenario, the first set-top box 120 and the second set-top box 220 are connected via network 300, which can be the Internet or a private network. The called party television set 130 is not turned on, and the calling party television set 230 may or may not be turned off. The first television set 130 is connected to both the first remote control device 110 and the first set-top box 120. The second television set 230 is connected to both the second remote control device 210 and the second set-top box 220. For the sake of clarity, in the following example, the calling party television set 230 is assumed to be turned off.

In some embodiments, the first remote control device 110 initiates a call by directly dialing the second remote control device 210. In some embodiments, each remote control device has a unique identifier, and in order to dial the called remote control device, the calling remote control device dials the called remote control device based on the unique identifier of the called remote control device. The first remote control device 110 sends a call request to the first set-top box 120 through a wireless interface. In some embodiments, the first set-top box and the first remote control device communicate via the wireless interface using Bluetooth, Wi-Fi, 2.4G, etc. by simulating input/output operations. After the first set-top box 120 receives the call request, the first set-top box 120 issues another call request via an invite message to the second set-top box 220. In some embodiments, the invite message can be issued via a session initiation protocol (SIP) or a private protocol. The second set-top box 220 receives the call request via the invite message, determines that the local television set is turned off, and notifies the second remote control device 210 via a wireless interface that a call is incoming. In some embodiments, upon receiving the call request, the second remote control device 210 issues a notification message. In some embodiments, the notification message is sent via the wireless interface using Bluetooth, Wi-Fi, 2.4G, etc. by simulating input/output operations. The second remote control device 210 receives the call request and provides a user prompt in response to the notification message. Moreover, after receiving the call request, the second communication device 200 establishes a communication connection (e.g., a session based on the SIP or the private protocol) with the first communication device 100 via the second set-top box 220.

In some embodiments, two techniques for establishing a call exist.

In a first technique, party A calls party B; party B sends a response (accept or reject) to party A; and party A notifies party B that it is establishing or canceling the session.

In a second technique, party A calls party B; if party B accepts, party B notifies party A of the acceptance and party A will join a session after party B sends a session successfully established message or if party B rejects, party B notifies party A of a rejection.

Also, different implementations can be used. Some public protocols (such as SIP and H.323) all use the first technique; however, the second technique is typically used by private protocols (protocols other than SIP or H.323).

In an actual application, the second remote control device 210 can provide the user prompt in the form of an audio prompt, a vibration prompt, a screen display prompt, or any combination thereof. Optionally, the second remote control device 210 can additionally include an earphone interface. In some embodiments, the user prompt is provided through the connected earphone interface as an audio prompt.

After the communication connection is established, voice communication can be conducted between the first communication device 100 and the second communication device 200. As an example, the process where the first communication device 100 sends voice signals to the second communication device 200 includes: the first remote control device 110 captures audio signals using its onboard microphone and voice signal processing software, and sends the captured audio signals to the first set-top box 120 via a communication interface; after the first set-top box 120 receives the audio signals, the first set-top box 120 digitizes the audio signals and sends the digitized audio signals via a network 300 to the second set-top box 220; after the second set-top box 220 receives the digitized audio signals, the second set-top box 220 sends the digitized audio signals to the second remote control device 210; and after the second remote control device 210 receives the digitized audio signals, the second remote control device 210 sends the digitized audio signal to a speaker (e.g., a Bluetooth speaker), or converts the digitized audio signal to analog signals and sends the analog signal to a conventional analog speaker. The process where the second communication device 200 sends voice signals to the first communication device 100 is similar to the above process except the roles of the first/second remote control devices/set-top boxes are reversed. As described above, while the television sets are turned off, receiving and issuing voice call requests and conducting voice communications are possible.

In the above embodiment of the system 1000 of FIG. 1, the television set of the called party device is turned off. Therefore, whether the calling party television is turned on or not does not affect the performing of communication. Either way, voice calling can be implemented in the above system 1000. In the event that the detection that the called party television set has been turned on during voice communication and the calling party television set is also on, conducting a video call between the two communication devices is possible.

Figure 2:
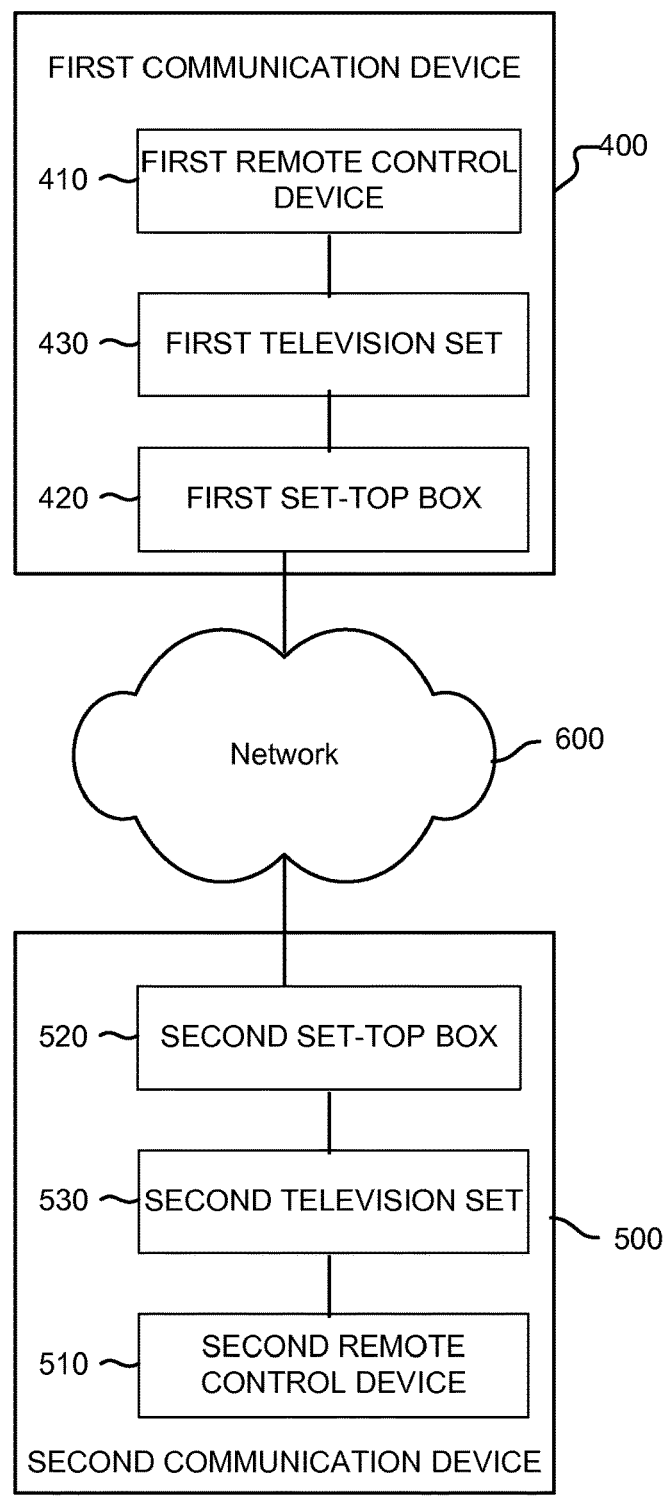
FIG. 2 is a structural block diagram of another embodiment of a system for communication.

FIG. 2 is a structural block diagram of another embodiment of a system for communication. In some embodiments, the system 2000 includes a first communication device 400 and a second communication device 500 connected via a network 600. The first communication device 400 includes a first remote control device 410, a first set-top box 420, and a first television set 430. The first remote control device 410, the first set-top box 420, and the first television set 430 correspond to the first remote control device 110 of FIG. 1, the first set-top box 120 of FIG. 1, and the first television set 130 of FIG. 1, respectively. The second communication device 500 includes a second remote control device 510, a second set-top box 520, and a second television set 530. The second remote control device 510, the second set-top box 520, and the second television set 530 correspond to the second remote control device 210 of FIG. 1, the second set-top box 220 of FIG. 1, and the second television set 230 of FIG. 1, respectively.

In some embodiments, the television sets 430 and 530 correspond to smart television terminals that have a preinstalled operating system allowing software programs to be installed or uninstalled freely, and have video, entertainment, game, and other functions. In some embodiments, both the first television set 430 and the second television set 530 are turned on. The first television set 430 is connected to both the first remote control device 410 and the first set-top box 420. The second television set 530 is connected to both the second remote control device 510 and the second set-top box 520. After a communication connection has already been established between the first set-top box 420 and the second set-top box 520, if both the first television set 430 and the second television set 530 are turned on, the first television set 430 and the second television set 530 can perform video communication. For example, the communication connection has been established similarly to the system 1000 of FIG. 1 or voice communication only when one or both television sets are off. The above communication can be implemented through video images and audio information captured by the set-top boxes or through audio information only if one or both television sets are turned off. Through the system 2000, the television set video can be turned on or off in the midst of a voice communication process. Seamless switching between voice communication and video communication is thus achieved.

Figure 3:
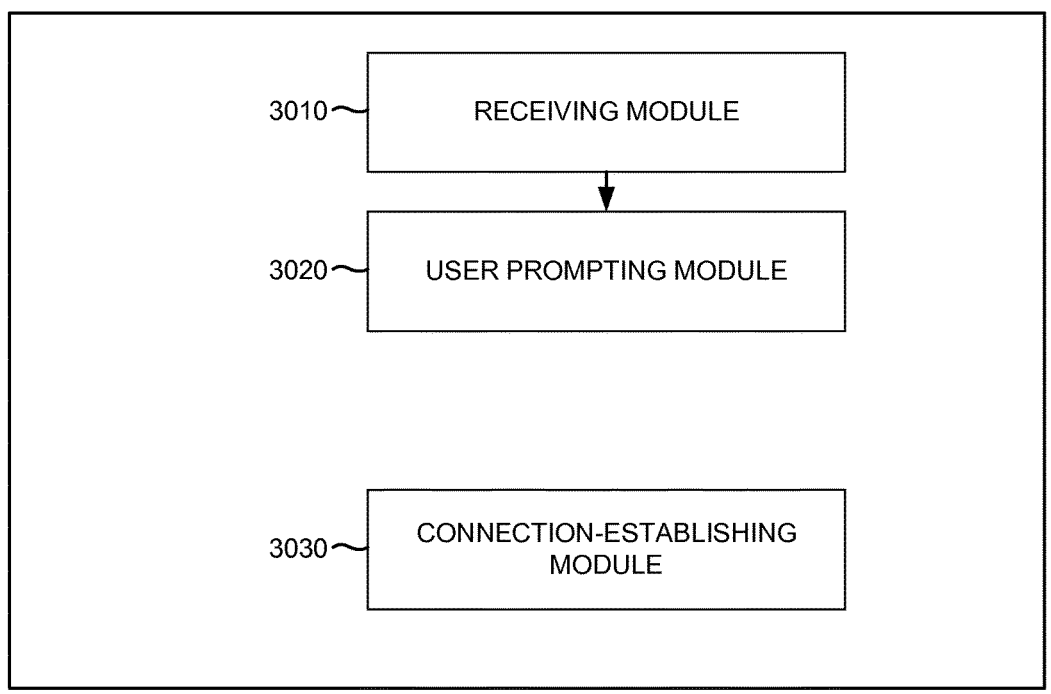
FIG. 3 is a structural block diagram of an embodiment of a remote control device.

FIG. 3 is a structural block diagram of an embodiment of a remote control device. Wireless interfaces are set up between remote control devices and set-top boxes. Wireless communication is performed. In some embodiments, the wireless interfaces are based on a wireless interface technology such as Wireless Fidelity (Wi-Fi) or Bluetooth. In some embodiments, the remote control device 3000 is an implementation of the first remote control device 110 of FIG. 1 or the first remote control device 410 of FIG. 2 and comprises: a receiving module 3010, a user prompting module 3020, and a connection-establishing module 3030.

In some embodiments, the receiving module 3010 receives a notification message from a set-top box of a communication device. In some embodiments, the notification message provides notification that a call request message was received by the set-top box from the opposing communication device and that the television set is turned off. As an example, the opposing communication device includes a set-top box and a remote control device.

In some embodiments, the user prompting module 3020 is coupled to the receiving module 3010, responds to the notification message, and provides a user prompt. As an example, the user prompt is provided in the form of an audio prompt, a vibration prompt, a screen display prompt, or any combination thereof.

In some embodiments, the connection-establishing module 3030 establishes a communication connection through the set-top box with the opposing communication device after receiving a call response. A call response is feedback from a user (acceptance or rejection of a call). As an example, after receiving the call response issued by the user, the connection-establishing module 3030 issues a voice channel connecting message through a wireless interface to the set-top box. After receiving the voice channel connecting message, the set-top box sends an acknowledgement message (also referred to as an OK message) to the opposing communication device. The OK message indicates that the voice channel has been connected, and thus a communication connection is established between the local communication device and the opposing communication device. As a result, voice communication can occur between a local user and a remote user. In some embodiments, the user uses a button on the remote control device 3000 to issue a call response, thus causing the connection-establishing module 3030 to receive the call response.

Figure 4:
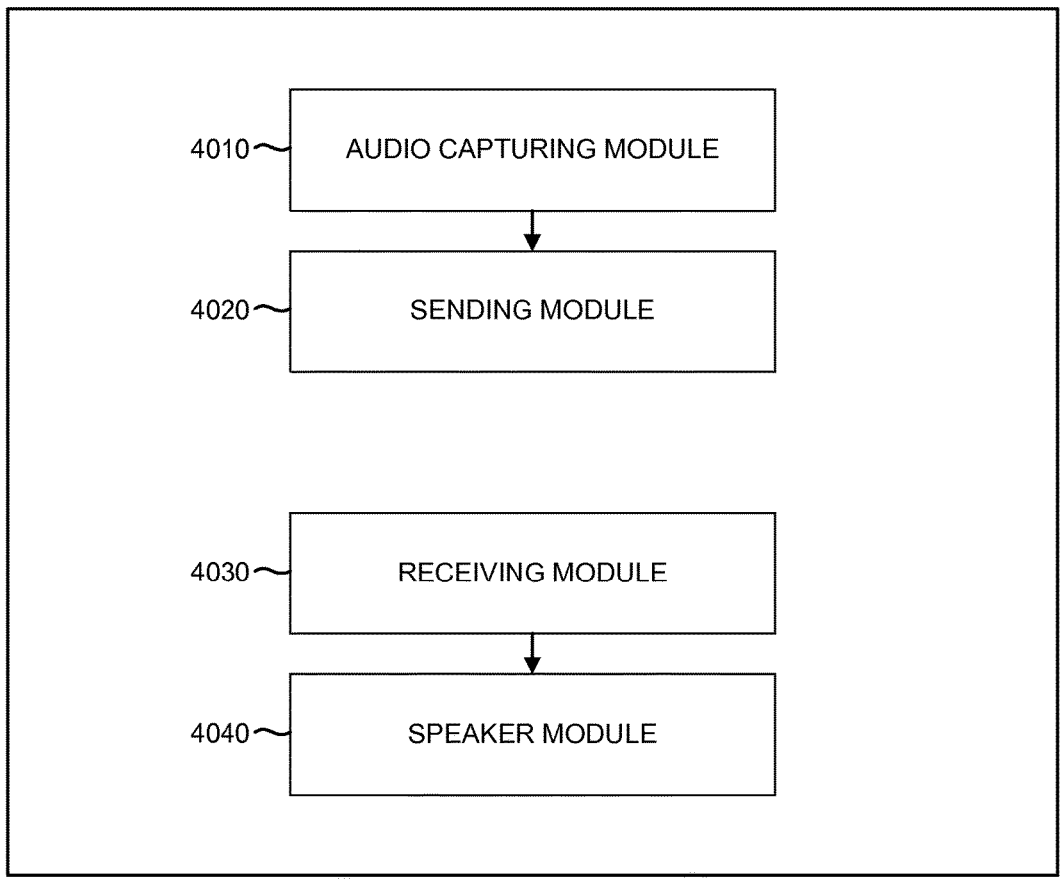
FIG. 4 is a structural block diagram of another embodiment of a remote control device.

FIG. 4 is a structural block diagram of another embodiment of a remote control device. In some embodiments, the remote control device 4000 is an implementation of the first remote control device 110 of FIG. 1 or the first remote control device 410 of FIG. 2 and comprises: an audio capturing module 4010, a sending module 4020, a receiving module 4030, and a speaker module 4040.

In some embodiments, the audio capturing module 4010 captures first audio signals.

In some embodiments, the sending module 4020 is coupled to the audio capturing module 4010 and sends the first audio signals captured by the audio capturing module 4010 to a set-top box connected to a remote control device so that the set-top box sends the first audio signals to an opposing communication device.

In some embodiments, the receiving module 4030 receives second audio signals through a set-top box from the opposing communication device.

In some embodiments, the speaker module 4040 is coupled to the receiving module 4030 and subjects the second audio signals from the opposing communication device to speaker processing. An example of speaker processing includes receiving side automatic gain control (AGC).

In some embodiments, the audio capturing module 4010 and the sending module 4020 implement audio capturing and sending functions, and the receiving module 4030 and the speaker module 4040 implement audio receiving and audio playing functions.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

Figure 5:
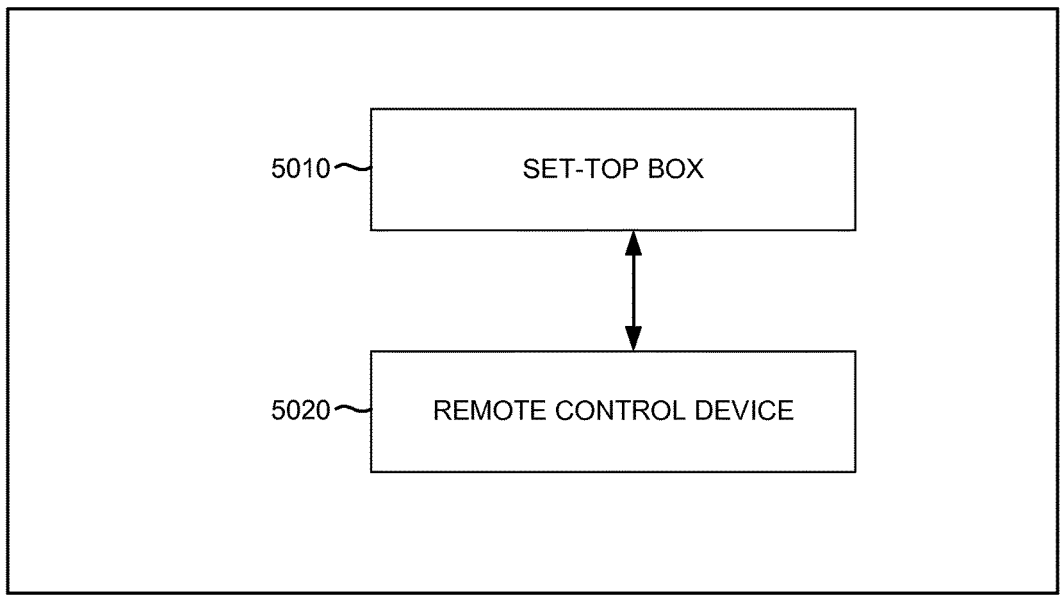
FIG. 5 is a structural block diagram of an embodiment of a device for communication.

FIG. 5 is a structural block diagram of an embodiment of a device for communication. In some embodiments, the device 5000 performs the process 6000 of FIG. 6 and comprises: a set-top box 5010 and a remote control device 5020.

In some embodiments, a wireless interface is set up between the set-top box 5010 and the remote control device 5020. In some embodiments, wireless communication is performed between the set-top box 5010 and the remote control device 5020. In some embodiments, the wireless interface can be based on wireless interface technology such as Wi-Fi or Bluetooth.

In some embodiments, the set-top box 5010 receives a call request message through a network from an opposing communication device and sends a notification message to the remote control device 5020 while a television set is turned off. In some embodiments, the set-top box 5010 is connected to the opposing communication device through a network (e.g., the Internet). After the set-top box 5010 receives the call request message sent by the opposing communication device, the set-top box 5010 notifies the remote control device 5020 through a wireless interface.

In some embodiments, the remote control device 5020 receives the notification message and provides a user prompt in response to receiving the notification message and establishes a communication connection through the set-top box with the opposing communication device after receiving a call response. In some embodiments, the remote control device 5020 further comprises a user prompting module (not shown) configured to provide a user prompts as: an audio prompt, a vibration prompt, a screen display prompt, or any combination thereof.

After the communication connection is established, the remote control device 5020 performs voice communication with the opposing communication device via the set-top box 5010. In some embodiments, the remote control device 5020 further comprises: an audio capturing module (not shown) configured to capture first audio signals, and a sending module (not shown) configured to send the captured first audio signals to the set-top box so that the set-top box will send the first audio signals to the opposing communication device. In some embodiments, the receiving module (not shown) receives second audio signals via the set-top box from the opposing communication device. In some embodiments, the speaker module (not shown) subjects the received second audio signals from the opposing communication device to speaker processing.

Figure 6:
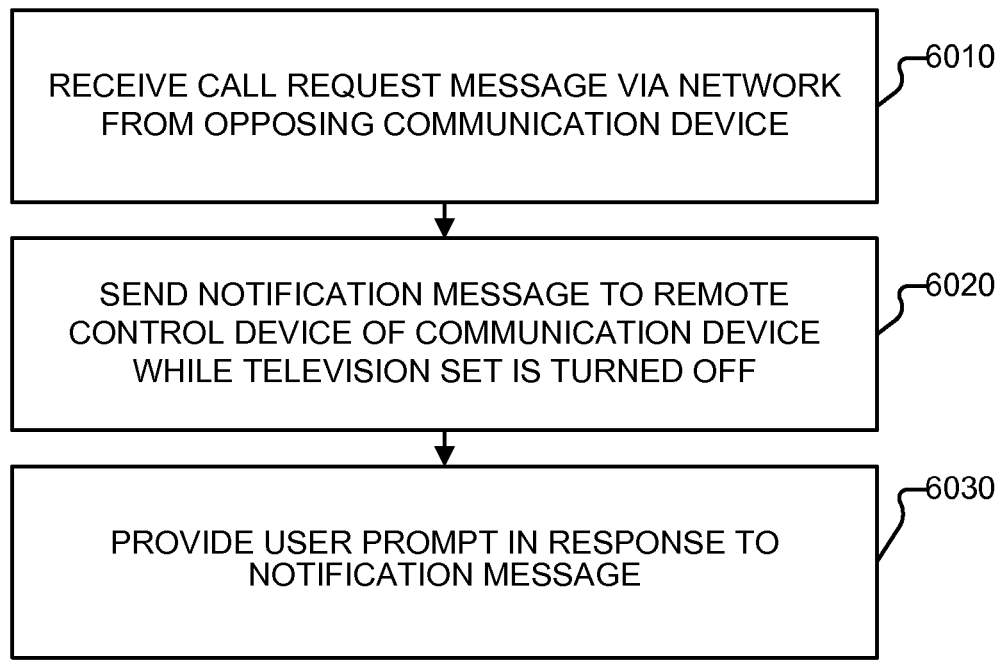
FIG. 6 is a flowchart of an embodiment of a process for communication.

FIG. 6 is a flowchart of an embodiment of a process for communication. In some embodiments, the process 6000 is implemented by a communication device 400 of FIG. 2 and comprises:

In 6010, a set-top box of the communication device receives a call request message via a network from an opposing communication device.

In 6020, the set-top box sends a notification message to a remote control device of the communication device while the television set is turned off.

In 6030, the remote control device provides a user prompt in response to receiving the notification message and establishes a communication connection through the set-top box with the opposing communication device after receiving a call response.

In some embodiments, the remote control device provides the user prompt as: an audio prompt, a vibration prompt, a screen display prompt, or any combination thereof.

After the communication connection is established, the remote control device conducts voice communication through the set-top box with the opposing communication device. The process 6000 includes: the remote control device captures first audio signals and sends the captured first audio signals via the set-top box to the opposing communication device, and the remote control device receives second audio signals via the set-top box from the opposing communication device and subjects the second audio signals to speaker processing.

In some embodiments, after the television set is detected to be turned on, the process 6000 further comprises: the television set cuts the connection between the set-top box and the remote control device and conducts video communication through the television set with the opposing communication device. Through the above process, television set video can be turned on or off during the voice communication. Seamless switching of the television between voice communication and video communication can thus be achieved.

Figure 7:
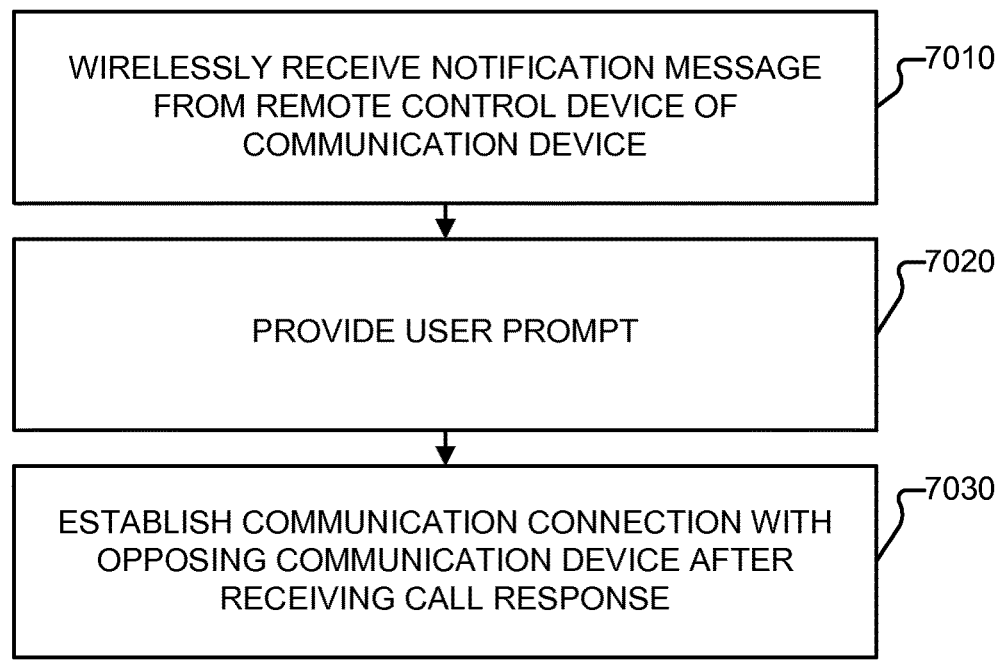
FIG. 7 is a flowchart of another embodiment of a process for communication.

FIG. 7 is a flowchart of another embodiment of a process for communication. In some embodiments, the process 7000 is implemented by a communication device 100 of FIG. 1 or a communication device 400 of FIG. 2 and comprises:

In 7010, a set-top box of the communication device wirelessly receives a notification message from a remote control device of the communication device. In some embodiments, the notification message gives notification that a call request message was received by the set-top box from an opposing communication device and that the television set is turned off.

In 7020, after the set-top box receives the notification message, the set-top box provides a user prompt. In some embodiments, the user prompt is provided as: an audio prompt, a vibration prompt, a screen display prompt, or any combination thereof.

In 7030, the set-top box establishes a communication connection with the opposing communication device after receiving a call response.

After the communication connection is established, voice communications are conducted between the set-top box and the opposing communication device. The voice communications include: capturing first audio signals and sending the captured first audio signals via the set-top box to the opposing communication device. Moreover, the set-top box receives second audio signals from the opposing communication device, and subjects the second audio signals to speaker processing.

Figure 8:
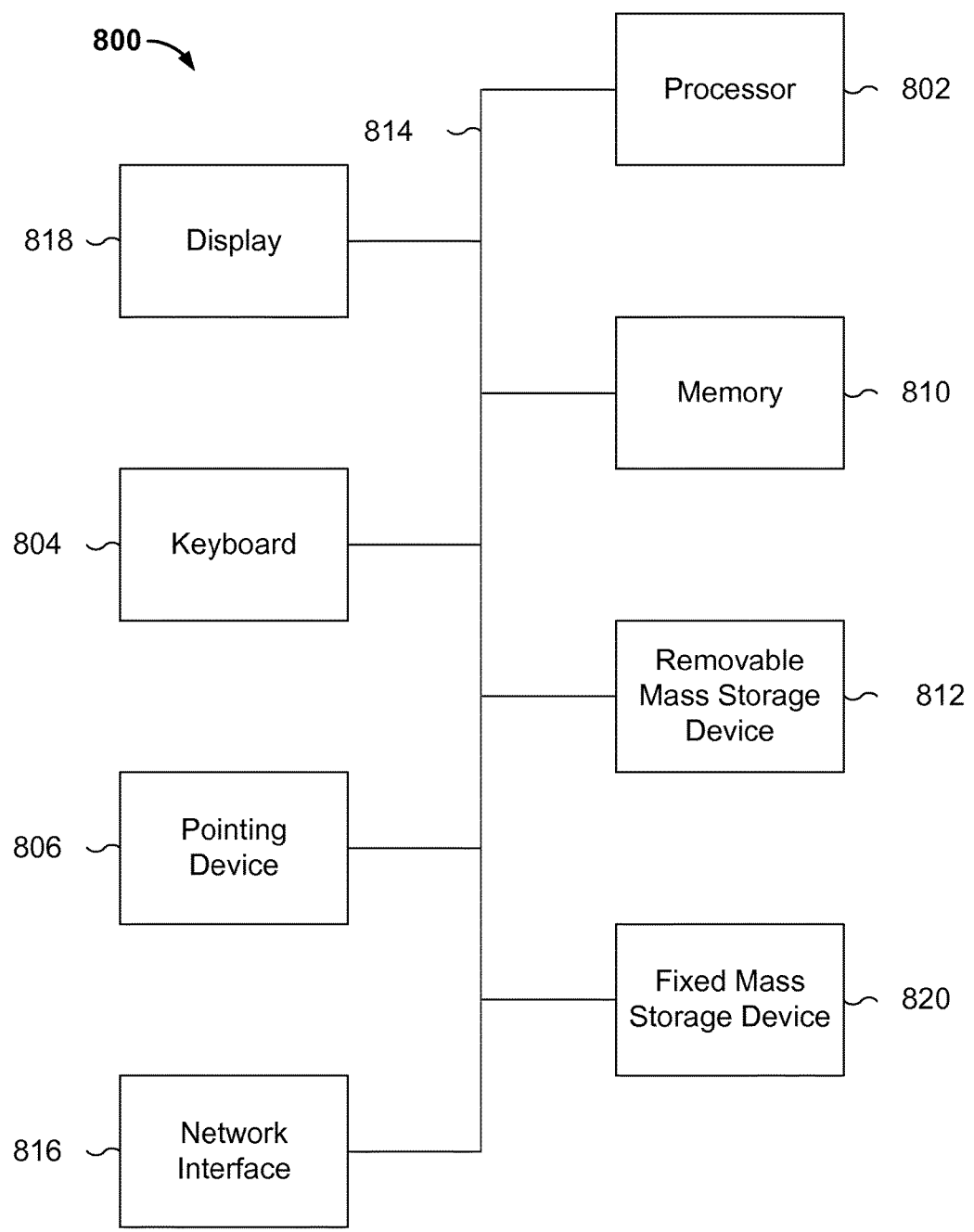
FIG. 8 is a functional diagram illustrating an embodiment of a programmed computer system for communication.

FIG. 8 is a functional diagram illustrating an embodiment of a programmed computer system for communication. As will be apparent, other computer system architectures and configurations can be used to perform communication. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer-readable storage media, described below, depending on whether, for example, data access needs to be bi-directional or unidirectional. For example, processor 802 can also directly and very rapidly retrieve and store frequently needed data in a cache memory (not shown).

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storages 812, 820 generally store additional programming instructions, data, and the like that typically are not in active use by the processor 802. It will be appreciated that the information retained within mass storages 812 and 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    receiving, via a set-top box of a first communication device, a call request message via a network from a second communication device;
    sending, via the set-top box, a notification message to a remote control device of the first communication device while a television set is turned off, wherein:
        the television set is connected to both the remote control device and the set-top box;
        in response to detecting that the television set is turned on, the television set conducts video communication with the second communication device, and
        in response to detecting that the television set is turned off, the set-top box conducts voice communication with the second communication device; and
        the television set, the set-top box, and the remote control device are separate from each other;
    providing, via the remote control device, a user prompt in response to the sending of the notification message;
    establishing, via the remote control device, a communication connection through the set-top box with the second communication device after receiving a call response, wherein the remote control device is wirelessly connected to the set-top box, wherein the television set is not capable of receiving the call request message while the television set is turned off; and
    in response to determinations that: the set-top box of the first communication device is conducting voice communication with the second communication device, one of the television set of the first communication device and a television set of the second communication device is turned on, and the other of the television set of the first communication device and the television set of the second communication device is turned on, switching the voice communication to video communication.

2. The method as described in claim 1, wherein the user prompt is provided as: an audio prompt, a vibration prompt, a screen display prompt, or any combination thereof.

3. The method as described in claim 1, further comprising:
    conducting, via the remote control device, voice communications through the set-top box with the second communication device, comprising:
        capturing, via the remote control device, first audio signals;
        sending, via the remote control device, the captured first audio signals through the set-top box to the second communication device;

receiving, via the remote control device, second audio signals through the set-top box from the second communication device; and sending, via the remote control device, the second audio signals to speaker processing.

4. The method as described in claim 3, wherein after detecting that the television set has been turned on:

disconnecting the set-top box and the remote control device; and conducting video communications through the television set with the second communication device.

5. A method, comprising:

wirelessly connecting a remote control device of a first communication device including voice capture and speaker functions to a set-top box of the first communication device;

receiving a notification message from the set-top box, wherein:

the notification message corresponds to a message that gives notification that a call request message was received by the set-top box from a second communication device and that a television set is turned off;

the television set is connected to both the remote control device and the set-top box;

in response to detecting that the television set is turned on, the television set conducts video communication with the second communication device, and in response to detecting that the television set is turned off, the set-top box conducts voice communication with the second communication device; and the television set, the set-top box, and the remote control device are separate from each other;

providing a user prompt in response to the receiving of the notification message;

establishing a communication connection through the set-top box with the second communication device after receiving a call response, wherein the television set is not capable of receiving the call request message while the television set is turned off; and in response to determinations that: the set-top box of the first communication device is conducting voice communication with the second communication device, one of the television set of the first communication device and a television set of the second communication device is turned on, and the other of the television set of the first communication device and the television set of the second communication device is turned on, switching the voice communication to video communication.

6. The method as described in claim 5, wherein the user prompt is provided as: an audio prompt, a vibration prompt, a screen display prompt, or any combination thereof.

7. The method as described in claim 6, further comprising:

conducting voice communications through the set-top box with the second communication device, comprising:

capturing first audio signals;

sending the captured first audio signals to the second communication device;

receiving second audio signals through the set-top box from the second communication device; and sending the second audio signals to speaker processing.

8. A first communication device, comprising:

a set-top box configured to:

receive a call request message via a network from a second communication device; and send a notification message to a remote control device while a television set is turned off, wherein:

the television set is connected to both the remote control device and the set-top box;

in response to detecting that the television set is turned on, the television set conducts video communication with the second communication device, and in response to detecting that the television set is turned off, the set-top box conducts voice communication with the second communication device; and the television set, the set-top box, and the remote control device are separate from each other; and the remote control device configured to:

provide a user prompt in response to the sending of the notification message;

establish a communication connection through the set-top box with the second communication device after receiving a call response, wherein the remote control device is wirelessly connected to the set-top box, wherein the television set is not capable of receiving the call request message while the television set is turned off; and in response to determinations that: voice communication is being conducted with the second communication device, one of the television set and a television set of the second communication device is turned on, and the other of the television set and the television set of the second communication device is turned on, switching the voice communication to video communication.

9. The first communication device as described in claim 8, wherein the user prompt is provided as: an audio prompt, a vibration prompt, a screen display prompt, or any combination thereof.

10. The first communication device as described in claim 8, wherein the remote control device is further configured to conduct voice communications through the set-top box with the second communication device, comprising to:

capture first audio signals;

send the captured first audio signals to the second communication device;

receive second audio signals through the set-top box from the second communication device; and send the second audio signals to speaker processing.

11. A first communication device, comprising:

a set-top box;

a remote control device including voice capture and speaker functions;

a connection module configured to wirelessly connect the remote control device to the set-top box;

a first receiving module configured to receive a notification message from the set-top box, wherein:

the notification message corresponds to a message that gives notification that a call request message was received by the set-top box from a second communication device and that a television set is turned off;

the television set is connected to both the remote control device and the set-top box;

in response to detecting that the television set is turned on, the television set conducts video communication with the second communication device, and in response to detecting that the television set is turned off, the set-top box conducts voice communication with the second communication device; and the television set, the set-top box, and the remote control device are separate from each other;

a user prompting module configured to provide a user prompt in response to the receiving of the notification message;

a connection-establishing module configured to establish a communication connection through the set-top box with the second communication device after receiving a call response, wherein the television set is not capable of receiving the call request message while the television set is turned off, and in response to determinations that: voice communication is being conducted with the second communication device, one of the television set and a television set of the second communication device is turned on, and the other of the television set and the television set of the second communication device is turned on, switching the voice communication to video communication.

12. The first communication device as described in claim 11, wherein the user prompting module is further configured to provide the user prompt as: an audio prompt, a vibration prompt, a screen display prompt, or any combination thereof.

13. The first communication device as described in claim 11, further comprising:

an audio capturing module configured to capture first audio signals;

a sending module configured to send the captured first audio signals to the second communication device;

a second receiving module configured to receive second audio signals through the set-top box from the second communication device; and a speaker module configured to send the second audio signals to speaker processing.

14. A system, comprising:

a first communication device, comprising:
a first remote control device configured to issue a call request; and
a first set-top box configured to:
receive the call request; and
send a call request message; and a second communication device, comprising:
a second set-top box configured to:
receive the call request message; and
in response to a determination that a television set is detected to be turned off, send a notification message to a second remote control device, wherein:
the television set is connected to both the second remote control device and the second set-top box;
in response to detecting that the television set is turned on, the television set conducts video communication with the first communication device, and
in response to detecting that the television set is turned off, the second set-top box conducts voice communication with the first communication device; and
the television set, the second set-top box, and the second remote control device are separate from each other; and the second remote control device configured to:
receive the notification message;
provide a user prompt in response to the receiving of the notification message;
establish a communication connection through the second set-top box with the first communication device after receiving a call response, wherein the second remote control device is wirelessly connected to the second set-top box, wherein the television set is not capable of receiving the call request message while the television set is turned off; and in response to determinations that: the first set-top box is conducting voice communication with the second communication device, one of a television set of the first communication device and the television set of the second communication device is turned on, and the other of the television set of the first communication device and the television set of the second communication device is turned on, switch the voice communication to video communication.

15. The system as described in claim 14, wherein:
the first remote control device is further configured to capture audio signals, and send the audio signals to the first set-top box;
the first set-top box is further configured to send the audio signals to the second set-top box;
the second set-top box is further configured to receive the audio signals, and send the audio signals to the second remote control device; and
the second remote control device is further configured to send the audio signals to speaker processing.

16. A computer program product being embodied in a tangible non-transitory computer readable storage medium and comprising computer instructions for:

receiving, via a set-top box of a first communication device, a call request message via a network from a second communication device;

sending, via the set-top box, a notification message to a remote control device of the first communication device while a television set is turned off, wherein:
the television set is connected to both the remote control device and the set-top box;
in response to detecting that the television set is turned on, the television set conducts video communication with the second communication device, and
in response to detecting that the television set is turned off, the set-top box conducts voice communication with the second communication device; and
the television set, the set-top box, and the remote control device are separate from each other;

providing, via the remote control device, a user prompt in response to the sending of the notification message;

establishing, via the remote control device, a communication connection through the set-top box with the second communication device after receiving a call response, wherein the remote control device is wirelessly connected to the set-top box, wherein the television set is not capable of receiving the call request message while the television set is turned off; and in response to determinations that: the first set-top box of the first communication device is conducting voice communication with the second communication device, one of the television set of the first communication device and a television set of the second communication device is turned on, and the other of the television set of the first communication device and the television set of the second communication device is turned on, switching the voice communication to video communication.

17. A computer program product, the computer program product being embodied in a tangible non-transitory computer readable storage medium and comprising computer instructions for:

wirelessly connecting a remote control device of a first communication device including voice capture and speaker functions to a set-top box of the first communication device;
receiving a notification message from the set-top box, wherein:
the notification message corresponds to a message that gives notification that a call request message was received by the set-top box from a second communication device and that a television set is turned off;
the television set is connected to both the remote control device and the set-top box;
in response to detecting that the television set is turned on, the television set conducts video communication with the second communication device, and
in response to detecting that the television set is turned off, the set-top box conducts voice communication with the second communication device; and
the television set, the set-top box, and the remote control device are separate from each other;
providing a user prompt in response to the receiving of the notification message;
establishing a communication connection through the set-top box with the second communication device after receiving a call response, wherein the television set is not capable of receiving the call request message while the television set is turned off; and
in response to determinations that: the first set-top box of the first communication device is conducting voice communication with the second communication device, one of the television set of the first communication device and a television set of the second communication device is turned on, and the other of the television set of the first communication device and the television set of the second communication device is turned on, switching the voice communication to video communication.

18. A method, comprising:
receiving, via a set-top box of a first communication device, a call request message via a network from a second communication device;
in response to a determination that a call is accepted:
sending, via the set-top box, a notification message to a remote control device of the first communication device while a television set is turned off, the call request message including a call acceptance message, wherein:
the television set is connected to both the remote control device and the set-top box;
the television set, the set-top box, and the remote control device are separate from each other;
in response to detecting that the television set is turned on, the television set conducts video communication with the second communication device, and
in response to detecting that the television set is turned off, the set-top box conducts voice communication with the second communication device; and
the notification message corresponds to an acceptance message;
providing, via the remote control device, a user prompt in response to the sending of the notification message;
establishing, via the remote control device, a communication connection through the set-top box with the second communication device, wherein the remote control device is wirelessly connected to the set-top box, wherein the television set is not capable of receiving the call request message while the television set is turned off;
in response to determinations that: the first set-top box of the first communication device is conducting voice communication with the second communication device, one of the television set of the first communication device and a television set of the second communication device is turned on, and the other of the television set of the first communication device and the television set of the second communication device is turned on, switching the voice communication to video communication; and
in response to a determination that a call is rejected:
performing one of the following:
sending, via the set-top box, a notification message to a remote control device of the first communication device while a television set is turned off, wherein the television set is connected to both the remote control device and the set-top box, and wherein the notification message corresponds to a rejection message; or
receiving, from the first communication device, a message that the communication connection has been canceled; and
omitting establishing a communication connection through the set-top box with the second communication device.

19. A method, comprising:
wirelessly connecting a remote control device of a first communication device including voice capture and speaker functions to a set-top box of the first communication device;
receiving a notification message from the set-top box, wherein:
the notification message corresponds to a message that gives notification that a call request message was received by the set-top box from a second communication device and that a television set is turned off;
the television set is connected to both the remote control device and the set-top box;
in response to detecting that the television set is turned on, the television set conducts video communication with the second communication device, and
in response to detecting that the television set is turned off, the set-top box conducts voice communication with the second communication device; and
the television set, the set-top box, and the remote control device are separate from each other; and
in response to a determination that the notification message is an acceptance message:
providing a user prompt in response to the receiving of the notification message;
establishing a communication connection through the set-top box with the second communication device, wherein the television set is not capable of receiving the call request message while the television set is turned off; and
in response to determinations that: the first set-top box of the first communication device is conducting voice communication with the second communication device, one of the television set of the first communication device and a television set of the second communication device is turned on, and the other of the television set of the first communication device and the television set of the second communication device is turned on, switching the voice communication to video communication.

20. The method as described in claim 1, wherein the communication connection includes a session based on a session initiation protocol (SIP) or a private protocol.

21. The method as described in claim 1, further comprising: in response to determinations that: the television set of the first communication device is conducting video communication with the television set of the second communication device and one of the television set of the first communication device and the television set of the second communication device is turned off, switching the video communication to voice communication.

* * * * *